United States Patent [19]

Apel et al.

[11] 4,064,773

[45] Dec. 27, 1977

[54] SOUND DEADENING MEANS FOR USE ON A BAR FEEDING MACHINE

[76] Inventors: Fred B. Apel, 22560 Kenwyck, Southfield, Mich. 48076; Jerome B. Olson, 15341 Oak Park Blvd., Oak Park, Mich. 48237

[21] Appl. No.: 712,686

[22] Filed: Aug. 9, 1976

[51] Int. Cl.² .............................................. B23B 13/00
[52] U.S. Cl. ...................................... 82/38 A; 181/205
[58] Field of Search ..................... 82/38 A; 181/33 M; 29/235

[56] References Cited

U.S. PATENT DOCUMENTS

| 1,786,876 | 12/1930 | Tessky | 181/33 M |
| 2,941,571 | 6/1960 | Rothermel | 29/235 |
| 3,176,388 | 4/1965 | Dutton | 29/235 X |
| 3,752,259 | 8/1973 | Wright et al. | 82/38 A |
| 3,828,630 | 8/1974 | Argereau | 82/38 A |
| 3,954,031 | 5/1976 | Tull et al. | 82/38 A |

Primary Examiner—Leonidas Vlachos
Attorney, Agent, or Firm—Gifford, Chandler, Sheridan & Sprinkle

[57] ABSTRACT

An elongated non metallic cylindrical tubular member is provided and adapted to be received in the feed tube of a bar feeding machine. The cylindrical member is provided with an inside diameter sufficient to receive bar stock therethrough and functions to cushion the impact of the bar against the feed tube thereby reducing the sound levels produced by the machine. The tubular member includes at least one end extending outwardly from one end of the feed tube and means mounted to the end of the tubular member to retain it in place.

8 Claims, 3 Drawing Figures

SOUND DEADENING MEANS FOR USE ON A BAR FEEDING MACHINE

BACKGROUND OF THE INVENTION

I. Field of the Invention

The present invention relates generally to sound deadening devices, and more particularly, to such a device for use in conjunction with a bar feeding machine.

II. Description of the Prior Art

In bar feeding machines, a bar or stock is fed through an elongated feed tube to a rotating chuck which accepts the bar and forms a work article therefrom. In practice it has been found that the vibrations between the bar and the feed tube creates objectionable sound levels which may be injurious to the health of the machine operator. In order to combat this safety hazard, the Federal Office of Health and Safety Administration (OSHA) has issued regulations which prescribe the maximum sound levels that will be tolerated from bar feeding machines.

One previously known device to deaden the vibration between the bar and the feed tube and thus reduce the noise levels during operation of the machine is described in U.S. Pat. No. 3,828,630 issued on Aug. 13, 1974 to Argereu. In this previously known device, a plurality of resilient discs are placed around the bar at spaced intervals along the bar and serve to dampen the vibration between the bar and the feed tube. Although the Argereu device adequately reduces the sound levels, it is disadvantageous in that the discs must be individually placed around each bar which, in practice, has proven to be a time consuming operation. Moreover, with the Argereu resilient discs, different discs must be provided for bars having different cross-sectional shapes.

SUMMARY OF THE PRESENT INVENTION

The present invention obviates the above mentioned disadvantages of sound deadening means for bar feeding machines by the provision of an elongated tubular member which is inserted within the feed tube and is mounted in place. The tubular member includes a sufficiently large inside diameter to receive the bar therethrough and functions to absorb impacts from the rotating bar thereby deadening and reducing the previously known objectionable sound levels. The tubular member includes portions extending outwardly from each end of the feed tube and means are provided around the outwardly extending ends of the tubular member to restrain the tubular member from longitudinal movement with respect to the feed tube to prevent it from being drawn into the machine and for easy subsequent removal of the tubular member from the feed tube.

The present invention in this manner thus provides a means whereby any number of bars may be continuously fed to the machine without need for readjustment of the sound deadening means. Furthermore, the sound deadening means of the present invention is easily and rapidly installed, interchangeable from one machine to another, and works equally well with all stock regardless of the cross-sectional shape of the stock. Lastly, the tubular member is not only relatively inexpensive to construct, but also enjoys a relatively long lifetime before replacement is necessary.

BRIEF DESCRIPTION OF THE DRAWINGS

A better understanding of the sound deadening means of the present invention will be had upon reference to the following detailed description when read in conjunction with the accompanying drawing, wherein like reference characters refer to like parts throughout the several views, and in which.

DETAILED DESCRIPTION

Figure 1:
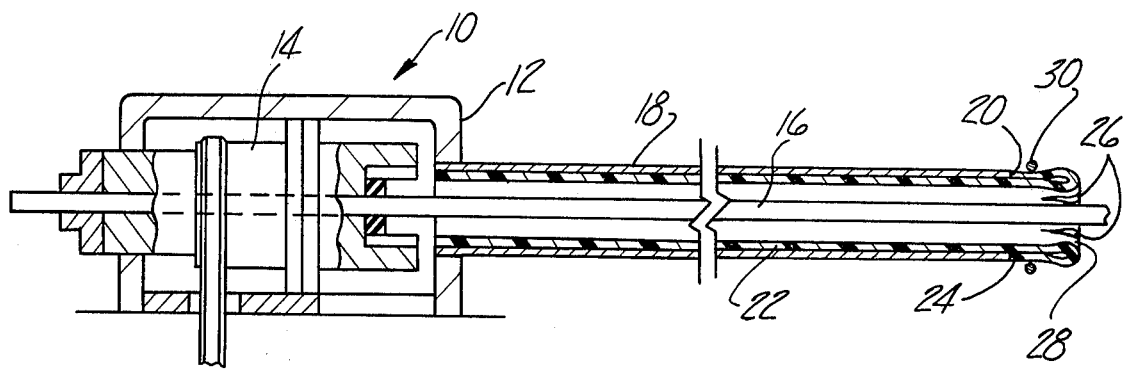
FIG. 1 is a cross-sectional view showing the sound deadening means of the present invention installed on a bar feeding machine.
Figure 2:
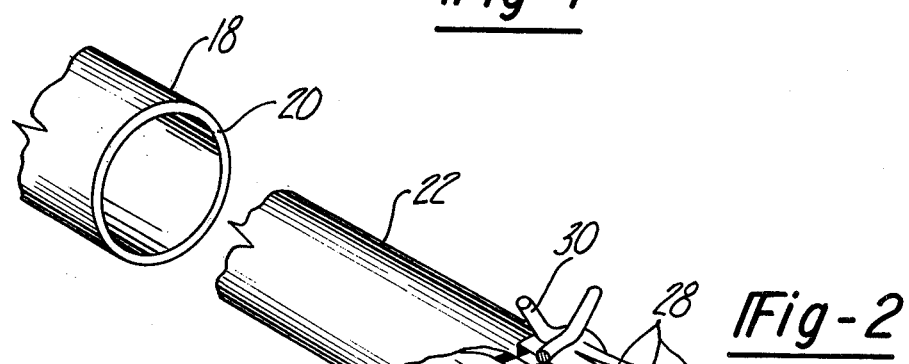
FIG. 2 is a perspective view in partial cross section showing one end of the tubular member extending outwardly from the feed tube.

Referring first to FIG. 1, a conventional bar feeding machine 10 is thereshown comprising a housing 12 enclosing a rotatable chuck 14. In a manner unimportant to the present invention, the chuck 14 functions upon rotation to form a work article from an elongated bar or stock 16.

The bar 16 may comprise any cross-sectional shape, such as square or hexagonal, and is received by the chuck 14 through an elongated feed tube 18 having an exposed end 20 for receiving the bar 16 therethrough. With the previously known practice, rotation of the chuck 14 causes the bar 16 to flex and impact against the feed tube 18. Since both the bar 16 and the feed tube 18 are typically constructed of metal for rigidity, the impact of the bar 16 against the tube 18 results in objectionable and unacceptable noise levels.

In order to deaden the sound caused by the impact of the bar 16 against the feed tube 18, the present invention provides an elongated non-metallic tubular cylindrical member 22 which is substantially of the same axial length as the feed tube 18 and is inserted into the feed tube 18. Preferably the member 22 is constructed of plastic or other resilient material and the outside diameter of the member 22 is only slightly smaller than the inside diameter of feed tube 18.

The tubular member 22 is thin walled so that bar 16 may be fed axially through the member 22. Since the tubular member 22 is non-metallic, it functions to absorb the impact of the bar 16 against the tube 18 upon rotation of the chuck 14, thereby effectively deadening the sound from the bar feeding machine 10. In practice, it has been found that the member 22 effectively decreases the noise level over eleven decibels under actual production conditions, thereby meeting the OSHA noise standards.

In order to both prevent the member 22 from being drawn into the machine 10 and to permit easy removal of the tubular member 22 from tube 18, the member 22 includes an enlarged diameter portion 24 extending outwardly from the exposed end 20 of the feed tube 18. A plurality of axial splices 26 in the member 22 form a plurality of finger segments 28 at the outwardly extending end of the tubular member 22. The fingers 28 are folded over and around the outer periphery of the member 22 and a clamp 30 retains the fingers 28 in their folded position. In this manner, the fingers 28 form the enlarged diameter portion 24 which abuts against the exposed end 20 of the tube 18 to prevent the member 22 from being drawn into the tube 18.

Figure 3:
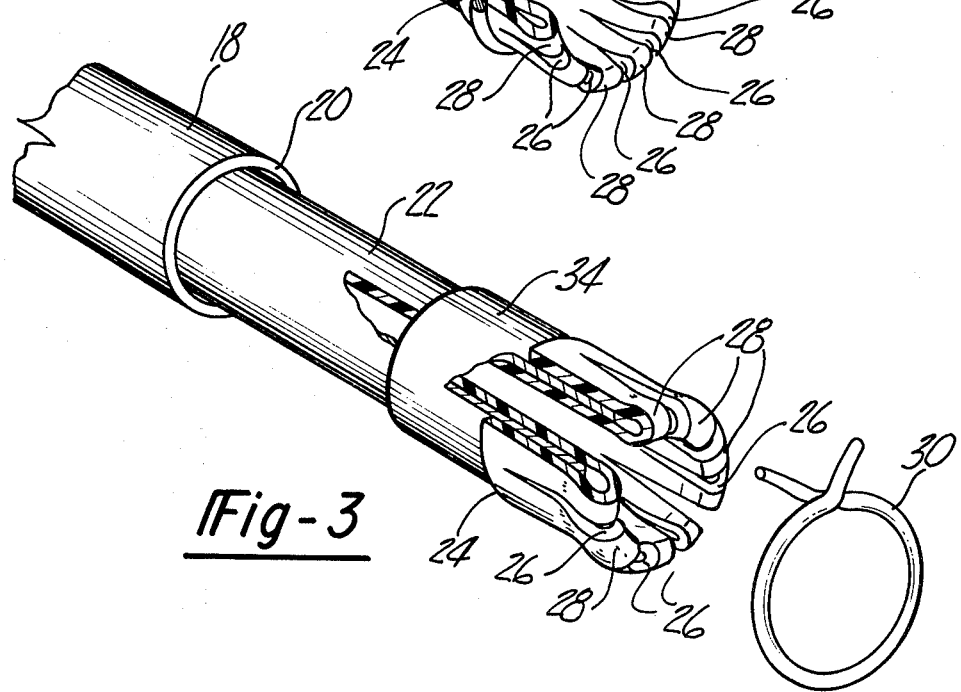
FIG. 3 is a view similar to FIG. 2, but exploded and showing a modification thereof.

A modification to the present invention is illustrated in FIG. 3, in which a tubular cylindrical segment 34 is provided around the outwardly extending end of the tubular member 22 coaxially with the feed tube 18. In the modification, the fingers 28 are folded over and around the cylindrical segment 34 and held in place by the clamp 30 so that the cylindrical segment 34 is sandwiched between the fingers 28 and outwardly extending end of the member 22. The segment 34 thus forms the enlarged diameter portion 24 which abuts against the exposed end 20 of the feed tube 18 to prevent the tubular member 22 from being drawn into the feed tube 18.

Although not shown, some feed tubes are open at both ends and in such constructions means can be provided at either or both ends of the tubular member 22 to prevent longitudinal movement of the tubular member 22 with respect to the feed tube. Also, instead of the arrangement shown in the drawings, the fingers 28 could be folded over the end of the feed tube 18 and held in place by the clamp 30. Also, clamps other than those shown could be used.

It can thus be seen that the present invention provides a novel means for deadening the sound from a bar feeding machine which is not only easy to install and remove from the machine, but is also relatively inexpensive to construct. Moreover, unlike the previously known sound deadening means, once installed, the present invention may receive bars of any cross-sectional shape and may also receive multiple bars without reinstallation or adjustment of the sound deadening means. The resilient material utilized to construct the tubular member 22 has the added advantage of resisting wear and tear produced by the bars and especially those having sharp edges such as those of polygonal cross-sectional shapes.

Having described our invention, many modifications thereto will become apparent to those skilled in the art to which it pertains without deviation from the spirit of the invention as defined by the scope of the appended claims.

We claim:

1. In combination with a machine of the type which operates upon a bar from which a work article is formed and including a feed tube through which the bar is fed, said tube having a first end positioned to feed the bar to said machine and a second, opposite end exposed for axially receiving the bar, sound deadening means comprising a non-metallic tubular cylindrical member adapted to fit within said tube and having an inside diameter larger than the diameter of said bar and at least one end of said member extending outwardly from said second end of said tube, a portion of said outwardly extending end of said sound deadening member being folded back upon itself to form an enlarged diameter portion having a circumferential edge which abuts said second end of said tube to prevent said sound deadening means from being moved axially inwardly into said tube with said bar.

2. The combination as defined in claim 1 and including clamp means for retaining said folded over portion of said sound deadening means in place.

3. The combination as defined in claim 1, wherein said member is constructed of plastic.

4. The combination as defined in claim 1, wherein the axial length of said member is substantially the same as said tube.

5. The combination as defined in claim 1, wherein said folded portion includes a plurality of axial splices therethrough to permit the folded portion to be folded around said member.

6. In combination with a machine of the type which operates upon a bar from which a work article is formed and including a feed tube through which the bar is fed, said tube having one end positioned to feed the bar to said machine and its other end exposed for receiving the bar, sound deadening means comprising a non-metallic tubular cylindrical member adapted to fit within said tube and having an inside diameter larger than the diameter of said bar and at least one end of said member extending outwardly from the end of said tube, and means mounted to said exterior end of said tubular member to restrain said tubular member from moving longitudinally in the direction of said machine, said last-mentioned means comprising a tubular cylindrical segment adapted to fit around the outwardly extending end of said member, a portion of said end of said member folded over the outer periphery of said segment and a clamp member positioned around said folded portion to secure said segment between said member and said folded portion wherein said segment forms an enlarged diameter portion which is adapted to abut against the exposed end of said tube to retain said segment exteriorly of said tube.

7. The combination as defined in claim 6, wherein said segment is coaxial with said tube.

8. The combination as defined in claim 6, wherein said folded portion includes a plurality of axial splices to permit the folded portion to be folded around said segment.

* * * * *